US011733510B2

(12) United States Patent
Pardo (10) Patent No.: US 11,733,510 B2
(45) Date of Patent: Aug. 22, 2023

(54) ELECTROMAGNETIC MICROACTUATOR APPARATUS AND METHOD

(71) Applicant: Nokia Technologies Oy, Espoo (FI)

(72) Inventor: Flavio Pardo, Glen Gardner, NJ (US)

(73) Assignee: Nokia Technologies Oy, Espoo (FI)

( * ) Notice: Subject to any disclaimer, the term of this patent is extended or adjusted under 35 U.S.C. 154(b) by 628 days.

(21) Appl. No.: 16/897,374

(22) Filed: Jun. 10, 2020

(65) Prior Publication Data

US 2021/0389586 A1 Dec. 16, 2021

(51) Int. Cl.
*G02B 26/08* (2006.01)
*H01F 7/08* (2006.01)
*H01F 41/02* (2006.01)
*H01F 7/06* (2006.01)

(52) U.S. Cl.
CPC ............ *G02B 26/085* (2013.01); *H01F 7/06* (2013.01); *H01F 7/081* (2013.01); *H01F 41/02* (2013.01); *H01F 2007/062* (2013.01)

(58) Field of Classification Search
CPC ......... G02B 26/085; H01F 7/06; H01F 7/081; H01F 41/02; H01F 2007/062; H01F 7/066
See application file for complete search history.

(56) References Cited

U.S. PATENT DOCUMENTS

| | | | | |
|---|---|---|---|---|
| 6,127,908 A * | 10/2000 | Bozler | ............... | H01P 1/20363 333/263 |
| 6,285,485 B1 * | 9/2001 | Ferreira | ............... | G02B 26/085 359/198.1 |
| 6,639,713 B2 * | 10/2003 | Chiu | ................... | G02B 6/3566 359/223.1 |
| 2002/0050744 A1 * | 5/2002 | Bernstein | ............. | G02B 26/085 310/40 MM |
| 2002/0171901 A1 | 11/2002 | Bernstein | ....................... | 359/199 |
| 2004/0160118 A1 * | 8/2004 | Knollenberg | ....... | G02B 26/0825 303/113.1 |
| 2005/0018322 A1 * | 1/2005 | Ben-Gad | ............ | G02B 26/0833 359/846 |
| 2009/0225324 A1 | 9/2009 | Bernstein et al. | ............ | 356/479 |
| 2017/0293136 A1 * | 10/2017 | Takimoto | ........... | G02B 26/0816 |

OTHER PUBLICATIONS

Lin, Lih Y., et al. "A Scanning Micro-mirror with an Adjustable Focal Length for Endoscope Applications", © 2014 IEEE, 3 pgs.
Jung, Woonggyu, et al., "Three-dimensional endoscope optical coherence tomography by use of a two-axis microelectromechanical scanning mirror", © 2006 American Institute of Physics, 4 pgs.
Kim, Ki Hean, et al., "Two-axis magnetically-driven MEMS scanning catheter for endoscopic high-speed optical coherence tomography", © 2007 OSA, 11 pgs.

* cited by examiner

*Primary Examiner* — Bernard Rojas
(74) *Attorney, Agent, or Firm* — Harrington & Smith (57) ABSTRACT

An apparatus and method of making the apparatus, the apparatus including an optical component; an electromagnetic microactuator configured to deflect the optical component; and a substrate configured to support the electromagnetic microactuator, wherein in an undeflected state the electromagnetic microactuator is configured to support the optical component above a plane of the substrate, and wherein the electromagnetic microactuator is configured to deflect from the undeflected state, to deflect at least a portion of the optical component towards the plane of the substrate without the portion of the optical component intersecting the plane of the substrate.

19 Claims, 7 Drawing Sheets

ELECTROMAGNETIC MICROACTUATOR APPARATUS AND METHOD

TECHNOLOGICAL FIELD

Embodiments of the present disclosure relate to an apparatus comprising an electromagnetic microactuator, and to a method.

BACKGROUND

A microactuator is a type of microelectromechanical system (MEMS) that functions as an actuator.

It is desirable to provide a microactuator that is fast, easy to miniaturize, and requires low electrical voltage to operate. These characteristics are desirable for use cases such as portable optical coherence tomography.

BRIEF SUMMARY

According to various, but not necessarily all, embodiments there is provided an apparatus comprising: an optical component; at least one electromagnetic microactuator configured to deflect the optical component; and a substrate configured to support the electromagnetic microactuator, wherein in an undeflected state the electromagnetic microactuator is configured to support the optical component above a plane of the substrate, and wherein the electromagnetic microactuator is configured to deflect from the undeflected state, to deflect at least a portion of the optical component towards the plane of the substrate without the portion of the optical component intersecting the plane of the substrate.

In some but not necessarily all examples, the electromagnetic microactuator comprises layers of materials having different stresses that curve the electromagnetic microactuator away from the plane of the substrate.

In some but not necessarily all examples, the apparatus according to any one or more of the preceding statements comprises a channel having a cross-sectional shape that substantially conforms to a cross-sectional shape of the electromagnetic microactuator, wherein the channel is substantially parallel to the plane of the substrate, and wherein the electromagnetic microactuator curves away from the channel.

In some but not necessarily all examples, the channel comprises a corrugated surface.

In some but not necessarily all examples, the electromagnetic microactuator according to any one or more of the preceding statements supports of the optical component via a resilient member, and wherein the resilient member is configured to resiliently linearly deflect as the electromagnetic microactuator deflects the portion of the optical component towards the plane of the substrate.

In some but not necessarily all examples, the electromagnetic microactuator according to any one or more of the preceding statements is configured to deflect in a first plane to deflect the portion of the optical component, and wherein the electromagnetic microactuator comprises a variable-thickness layer having a first stiffness against deflection in the first plane, and a second, greater stiffness against deflection in a second plane orthogonal to the first plane.

In some but not necessarily all examples, the electromagnetic microactuator according to any one or more of the preceding statements comprises one or more lengthwise beams extending from the substrate and configured to deflect in a first plane to deflect the portion of the optical component, wherein the electromagnetic microactuator comprises a lateral beam supported by the one or more lengthwise beams, and wherein the lateral beam comprises a twisted portion that stiffens the lateral beam against deflection in a second plane orthogonal to the first plane.

In some but not necessarily all examples, the electromagnetic microactuator according to any one or more of the preceding statements comprises a first lengthwise beam extending from the substrate and a second lengthwise beam extending from the substrate, wherein the first lengthwise beam and the second lengthwise beam diverge from each other at a proximal region, proximal to the substrate.

In some but not necessarily all examples, the electromagnetic microactuator according to any one or more of the preceding statements comprises a first lengthwise beam and a second lengthwise beam, wherein at least one of the first lengthwise beam or the second lengthwise beam comprises a transitional direction change at a distal corner region of at least one of the first lengthwise beam or the second lengthwise beam, and wherein the transitional direction change is in a direction that converges the first lengthwise beam and the second lengthwise beam towards each other.

In some but not necessarily all examples, a surface of the substrate according to any one or more of the preceding statements extends below the optical component.

In some but not necessarily all examples, the at least one electromagnetic microactuator according to any one or more of the preceding statements comprises a plurality of electromagnetic microactuators, collectively configured to deflect the optical component about at least two axes.

In some but not necessarily all examples, the plurality of electromagnetic microactuators comprises four electromagnetic microactuators in a quadrantic arrangement.

In some but not necessarily all examples, the electromagnetic microactuator according to any one or more of the preceding statements is further configured to deflect from the undeflected state to deflect the portion of the optical component away from the plane of the substrate.

In some but not necessarily all examples, the apparatus comprises a first electrical terminal and a second electrical terminal on the substrate, wherein the electromagnetic microactuator comprises electrically conductive material electrically interconnecting the first electrical terminal and the second electrical terminal, wherein the electrically conductive material is configured to extend in a path occupying a plane that is not wholly perpendicular to an applied magnetic field, and wherein the first electrical terminal, the second electrical terminal, and the electrically conductive material are configured for bi-directional electrical current flow to enable bi-directional deflection of the electromagnetic microactuator.

In some but not necessarily all examples, the apparatus according to any one or more of the preceding statements comprises a field generator configured to generate a magnetic field.

In some but not necessarily all examples, the electromagnetic microactuator is supported to a first side of the substrate, and wherein the field generator is supported to a second side of the substrate.

In some but not necessarily all examples, the optical component is a reflector.

In some but not necessarily all examples, the apparatus according to any one or more of the preceding statements comprises an optical coherence tomography system, wherein the reflector is positioned so that light from a light source of the optical coherence tomography system is incident on the reflector, and wherein the electromagnetic microactuator is configured to move the reflector in at least one direction relative to the optical coherence tomography system.

According to various, but not necessarily all, embodiments there is provided a method comprising:

providing a substrate configured to support at least one electromagnetic microactuator, wherein the electromagnetic microactuator is configured to deflect an optical component;

providing the electromagnetic microactuator; and providing the optical component;

wherein in an undeflected state the electromagnetic microactuator is configured to support the optical component above a plane of the substrate, and wherein the electromagnetic microactuator is configured to deflect from the undeflected state, to deflect at least a portion of the optical component towards the plane of the substrate without the portion of the optical component intersecting the plane of the substrate.

In some but not necessarily all examples, providing the electromagnetic microactuator comprises:

providing a channel having a cross-sectional shape that substantially conforms to a desired cross-sectional shape of the electromagnetic microactuator, wherein the channel is substantially parallel to the plane of the substrate;

depositing layers of materials in the channel, comprising introducing stresses into the different materials; and releasing the layers so that the layers of the electromagnetic microactuator curve away from the plane of the substrate.

According to various, but not necessarily all, embodiments there is provided an apparatus comprising: a component to be actuated; at least one electromagnetic microactuator configured to deflect the component; and a substrate configured to support the electromagnetic microactuator, wherein in an undeflected state the electromagnetic microactuator is configured to support the component above a plane of the substrate, and wherein the electromagnetic microactuator is configured to deflect from the undeflected state, to deflect at least a portion of the component towards the plane of the substrate without the portion of the component intersecting the plane of the substrate.

According to various, but not necessarily all, embodiments there is provided examples as claimed in the appended claims.

BRIEF DESCRIPTION

Some examples will now be described with reference to the accompanying drawings in which.

DETAILED DESCRIPTION

Examples of the disclosure relate to an apparatus 1 comprising: the optical component 14; the at least one electromagnetic microactuator 10 configured to deflect the optical component 14; and the substrate 20 configured to support the electromagnetic microactuator 10.

In a particular example, but not necessarily all examples, the apparatus 1 comprises an optical coherence tomography system, and the optical component 14 is a reflector such as a mirror. Electromagnetic actuation enables the apparatus 1 to have a faster response time than thermal/other actuators, with a low actuation energy requirement, to support rapid scanning by a portable scanner.

As illustrated in the Figures, in the undeflected state, the electromagnetic microactuator 10 is configured to support the optical component 14 above the plane 21 of the substrate 20. Supporting the optical component 14 above the substrate 20 makes the apparatus 1 less time-consuming to fabricate, because components of the apparatus 1 can be deposited onto the substrate 20 without needing to etch entire components out of the substrate 20. Example fabrication methods are described later.

In a particular example, the apparatus 1 may be configured to perform a tilt displacement of the optical component 14. In some, but not necessarily all examples, the apparatus 1 may be configured to tilt the optical component 14 about at least two orthogonal tilt axes X, Y (e.g. pitch, roll). The apparatus 1 may optionally be configured to perform a translation displacement Z of the optical component 14.

The optical component 14 is supported high enough above the substrate 20 so that if the electromagnetic microactuator 10 is deflected from the undeflected state in a downwards direction, the actuated portion of the optical component 14 does not intersect the plane 21 of the substrate 20.

Therefore, the space behind the substrate 20 is not required for accommodating displacement of the optical component 14. As a result, the apparatus 1 is easy to fabricate and package onto existing circuit boards, without limiting the range of displacement of the optical component 14. Some examples of the disclosure enable a high range of tilt displacement of the optical component 14, of at least 10 degrees or more.

Figure 1:
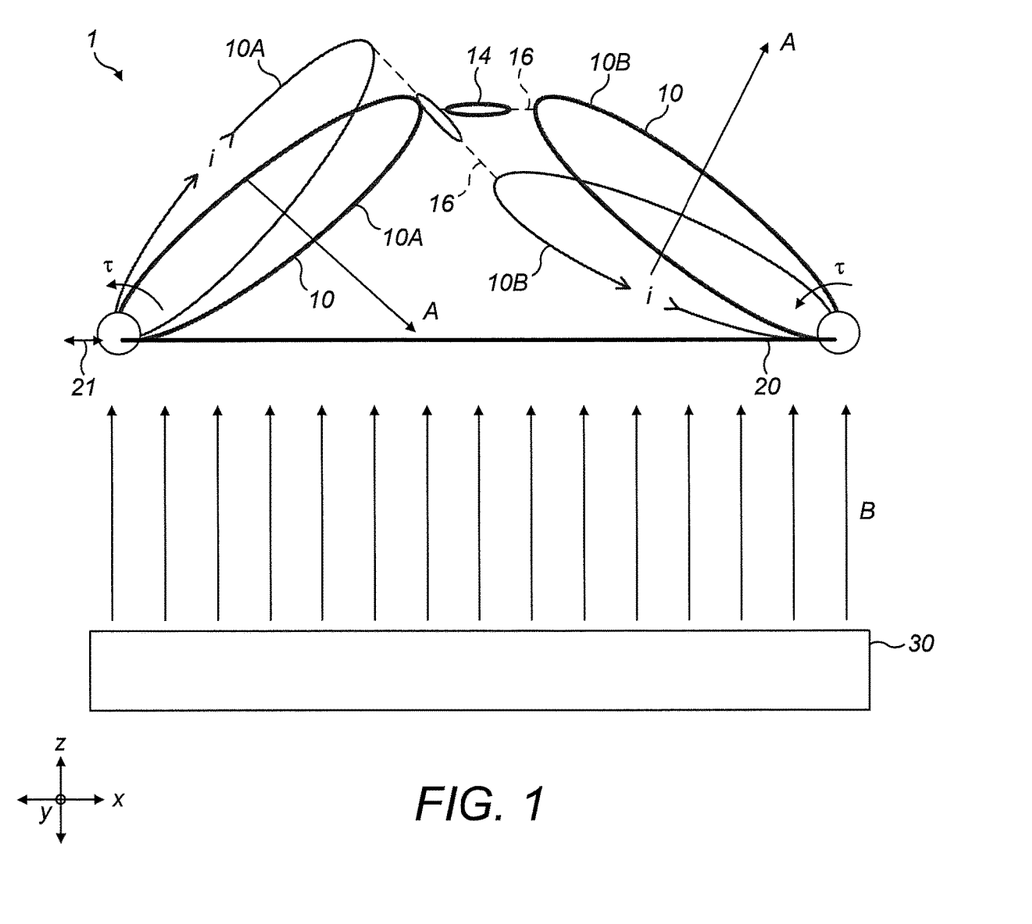
FIG. 1 illustrates an apparatus and the electromagnetic actuation principle of examples of the disclosure.

FIG. 1 schematically illustrates an example of the apparatus 1, with annotations to illustrate the electromagnetic actuation principle.

A pair of electromagnetic microactuators 10 comprising first and second electromagnetic microactuators 10A, 10B is shown, for tilting the optical component 14 about one axis. Later examples comprise multiple pairs of electromagnetic microactuators. In an alternative implementation, the apparatus 1 comprises only one electromagnetic microactuator 10 configured to tilt the optical component 14.

The electromagnetic microactuators 10A, 10B extend from the substrate 20 upwardly but non-vertically from the plane 21 of the substrate 20, to form splayed supports for suspending the optical component 14 above the substrate 20. The optical component 14 does not directly contact the underlying substrate 20. The substrate 20 may optionally extend below the optical component 14, as shown, as the apparatus 1 does not require the optical component 14 to be etched out of the substrate 20.

The electromagnetic microactuators 10A, 10B support the optical component 14 at different angularly separated portions (locations) of the periphery of the optical component 14. The periphery refers, for example, to the outer circumferential edge of a reflector. The specific angular separation of the support locations depends on the number and arrangement of electromagnetic microactuators.

The illustrated pair of electromagnetic microactuators 10A, 10B support the optical component 14 from opposite sides of the optical component 14.

As illustrated in FIG. 1, electromagnetic microactuators 10A, 10B are optionally oriented to approximately face a common centre (e.g. the optical component 14) from their respective positions around the periphery of the optical component 14. In this example, the pair of electromagnetic actuators face each other, to form a splayed support.

The electromagnetic microactuators 10A, 10B may or may not be directly connected to the optical component 14. In FIG. 1, a dashed line connects the distal ends of the electromagnetic microactuators 10A, 10B to the optical component 14. The dashed line represents an interconnecting member 16.

A field generator 30 is illustrated. The field generator 30 generates a magnetic field B that passes through the electromagnetic microactuators 10A, 10B to enable actuation by a Lorentz force. In some implementations, the field generator 30 is a permanent magnet. Alternatively, a coil under the electromagnetic microactuators 10A, 10B could be implemented, under the substrate 20 or on a board receiving the substrate.

The electromagnetic microactuators 10A, 10B comprise electrically conductive material following a loop-shaped path, intersected by the magnetic field. The loop is fixed to the substrate 20 at one end. The loop is schematically illustrated as a circular line. The loop can carry electrical current in at least a first direction or bi-directionally.

The electrical current i in the loop produces a torque τ on the loop, bending the loop upwards away from the substrate 20, or downwards towards the substrate 20, depending on the direction of the electrical current. The torque τ is proportional to the electrical current magnitude, and is derived from the Lorentz force equation as:

$$\tau = iA \times B$$

where i is the electrical current, A is the area vector of the loop, and B is the magnetic field.

In FIG. 1, loops in thick lines represent the first and second electromagnetic actuators in their neutral, undeflected states, in which no electrical current is passed through the electromagnetic microactuators. In this state, the optical component 14 is held in an undeflected position which may be parallel to the substrate 20 as shown.

In FIG. 1, loops in thin lines show the electromagnetic microactuators 10A, 10B in their deflected states, in which electrical current is passed through the electromagnetic microactuators 10A, 10B. The first electromagnetic microactuator 10A receives a clockwise electrical current relative to the z-axis magnetic field. At the distal portion of the loop, which is above the plane 21 of the substrate 20, the electrical current flows predominantly in the y-direction. The resulting force imparts a torque about the fixed end of the first electromagnetic microactuator 10A that causes the loop to deflect upwardly in a curved path, displacing a portion of the optical component 14 upwardly away from the substrate 20.

The second electromagnetic microactuator 10B receives an anti-clockwise electrical current so is deflected downwardly in a curved path, displacing a portion of the optical component 14 towards the substrate 20. The combination of these two deflections causes the optical component 14 to tilt clockwise about the y-axis in FIG. 1.

Note that the distal ends of the electromagnetic microactuators 10A, 10B are further apart from each other in the deflected position than in the undeflected position. Assuming the optical component 14 is unable to elastically stretch to accommodate the greater separation, the interconnecting member may be configured as a resilient member 16 that can elastically stretch during the deflection. In the case of FIG. 1, the resilient member 16 extends elastically in the manner of a linear spring.

Although not illustrated in FIG. 1, the electrical current directions could also be reversed, so that first electromagnetic microactuator 10A deflects upwards and the second electromagnetic microactuator 10B deflects downwards. This would cause the optical component 14 to tilt anticlockwise.

In some, but not necessarily all examples, the pair of electromagnetic microactuators 10A, 10B may be wired in pairs such that electrical current flows in opposite directions of respective ones of the pair of electromagnetic microactuators 10A, 10B, for opposite bending.

Figure 2:
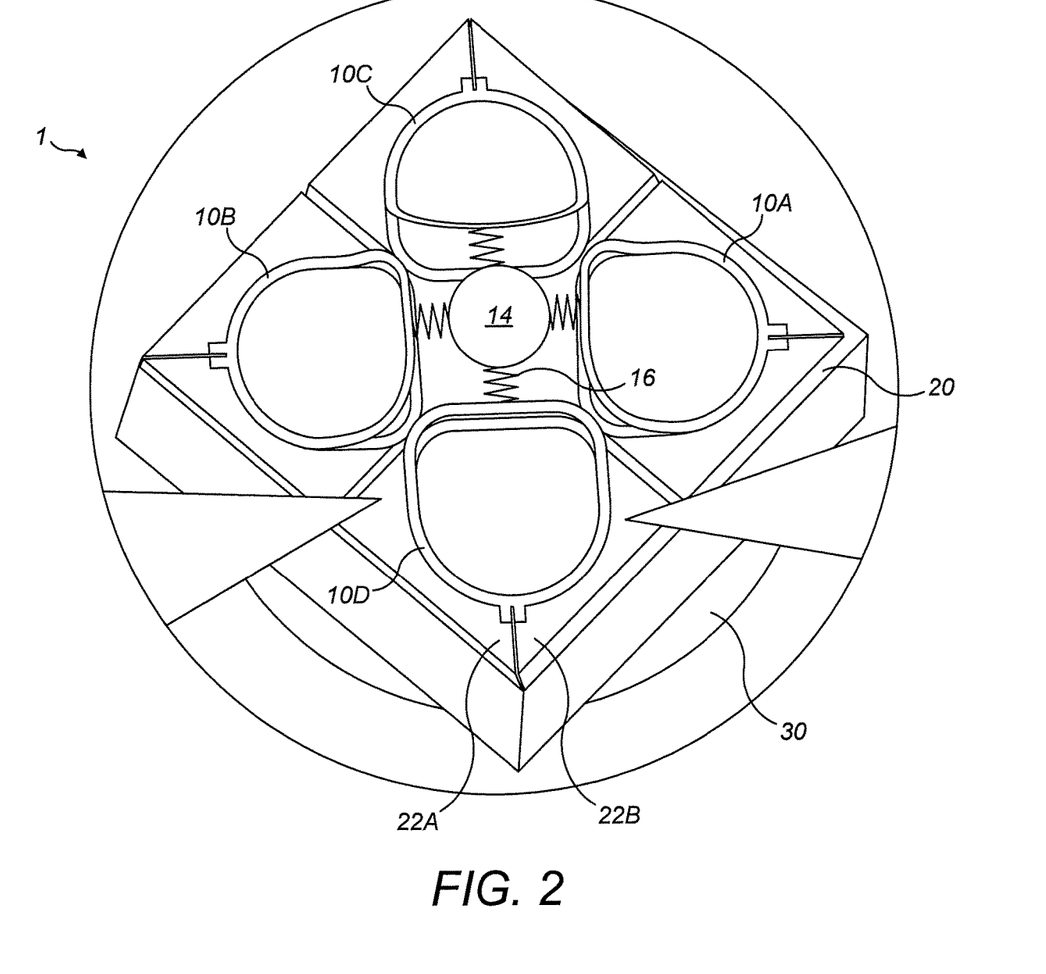
FIG. 2 illustrates an example of an apparatus for deflecting an optical component.
Figure 3:
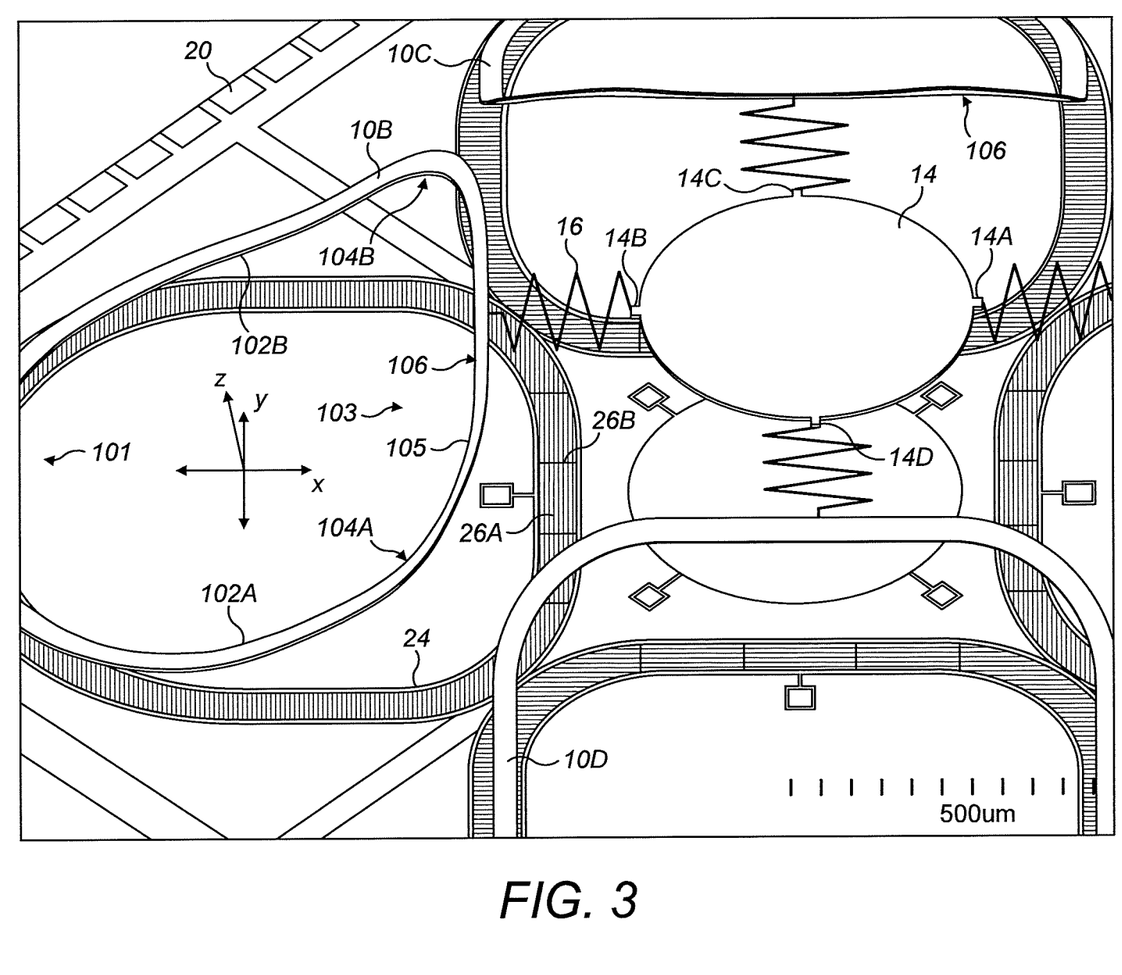
FIG. 3 illustrates a detail view of the apparatus of FIG. 2.

The shape of the loops and the direction of the magnetic field do not have to match the arrangement shown in FIG. 1, as long as the path occupies a plane that is not wholly perpendicular to the actuating magnetic field, and enables provision of an actuation torque that deflects the portion of the optical component 14 upwardly or downwardly (e.g. tilting). FIGS. 2 and 3 illustrate a more detailed implementation of the apparatus 1 of FIG. 1. FIG. 3 is a zoomed-in view of FIG. 2. In this implementation, the apparatus 1 is gimbal-less, to improve durability and reduce required electrical power.

FIGS. 2 and 3 show an arrangement of four electromagnetic microactuators 10A, 10B, 10C, 10D. The electromagnetic microactuators are in a quadrantic arrangement, in different quadrants around the optical component 14. The electromagnetic microactuators 10A, 10B, 10C, 10D may face the optical component 14 as shown. Therefore, the illustrated arrangement can be described as 90-degree rotational symmetry. If a different number of electromagnetic microactuators is provided, the order of rotational symmetry may match the number of electromagnetic microactuators 10 (e.g. three microactuators could be separated by 120 degrees). The illustrated arrangement of electromagnetic microactuators 10A, 10B, 10C, 10D has very low levels of mechanical crosstalk.

The arrangement comprises a first pair of opposing electromagnetic microactuators 10A, 10B, configured to tilt the optical component 14 about a first tilt axis, and a second pair of opposing electromagnetic microactuators 10C, 10D, configured to tilt the optical component 14 about a second tilt axis orthogonal to the first tilt axis. It would be appreciated that two-axis tilt can be enabled by fewer electromagnetic microactuators 10, such as three microactuators.

FIGS. 2 and 3 also show that the shape of the loop can be configured to provide an advantage. The shape of the electromagnetic microactuator (e.g. 10A) is configured to maximise the area vector while enabling adjacent electromagnetic microactuators (e.g. 10C, 10D) to be as close as possible to the optical component 14 without the electromagnetic microactuators 10A, 10B, 10C colliding with each other. An optimal shape corresponds to an intermediate shape between a four-sided quadrilateral and a circular shape. This enables the electromagnetic microactuators 10A-10D to be placed close to the optical component without colliding with each other at their adjacent corners. The specific illustration shows a squoval-shaped loop, which is one of several possible implementations.

The shape of the loop can be expressed as one or more lengthwise beams 102A, 102B extending generally in an x-direction towards the optical component 14, and a lateral beam 105 extending generally in a y-direction, interconnected to the lengthwise beam(s) 102A, 102B at a distal corner region(s) 104A, 104B. FIG. 3 illustrates the axes, which are local to each electromagnetic microactuator 10, wherein the x-axis extends towards the centre of the optical component 14.

In the illustration, a pair of lengthwise beams 102A, 102B are interconnected to each other by the lateral beam 105. The beams may be a continuum of the same material, in an example. The individual beams 102A, 102B, 105 have a generally high length:width ratio, so that most of the inner area of the loop is empty space. By maximizing the empty space, the loop is less prone to curling up into a spherical shape during actuation.

At a proximal region 101 of the span of the electromagnetic microactuator 10, the lengthwise beams 102A, 102B are supported by the substrate 20. The lengthwise beams 102A, 102B are electrically connected to a first electrical terminal 22A and a second electrical terminal 22B. The electrical terminals 22A, 22B provide an interface to controlling circuitry (not shown) for driving the required electrical current through the electromagnetic microactuators 10. The lengthwise beams 102A, 102B may be initially proximal to each other, separated by a small insulating gap to prevent short circuiting of the loop. Then, the lengthwise beams 102A, 102B extend towards the optical component 14 in the x-axis while curving upwardly in the z-axis, away from the plane 21 of the substrate 20. The upwards curvature may be a concave-up curve, increasing in gradient with distance, for example. As the lengthwise beams 102A, 102B curve upwardly, they may also diverge from each other in the y-axis, to enlarge the area of the loop. The divergence may be curved as illustrated, such that the beams initially diverge at a greater rate, or the divergence may have another geometry. The above geometry allows the first and second electrical terminals 22A, 22B to be placed close to each other to minimise the required size of the substrate 20, while allowing a large loop area.

At a distal region 103 of the span of the electromagnetic microactuator 10, the lengthwise beams 102A, 102B reach distal corner regions 104A, 104B, where the lengthwise beams 102A, 102B change direction from the x-direction to the y-direction towards each other, to form the lateral beam 105. The illustrated directional change is a transitional direction change, to obviate the aforementioned drawbacks of square loops. In particular, but not exclusively, a curved transitional direction change is shown.

At the distal region 103, the lateral beam 105 may be substantially at a constant height above the substrate 20. The illustrated lateral beam 105 is approximately tangential to the substantially circular edge of the optical component 14. In the Figures, but not necessarily all examples, the lateral beam 105 does not directly contact the optical component 14. The lateral beam 105 is separated from the optical component 14 by the resilient member 16. The resilient member 16 is connected at one end to the lateral beam 105 of the electromagnetic microactuator 10A, 10B, 10C or 10D, and at its other end to a non-central portion 14A, 14B, 14C or 14D of the optical component 14, such as a peripheral edge. The connection may be direct as shown, or indirect. The resilient member 16 may connected to the lateral member at a location halfway along the span of the lateral member, and on the axis of symmetry of the loop.

FIGS. 2 and 3 also show that the resilient member 16 may be a thin serpentine spring. The serpentine spring can elastically stretch to at least 100% of its original, neutral length to accommodate the divergence of the electromagnetic microactuators 10 during deflection. The illustrated serpentine spring 16 could extend to 300% of its original neutral length. The serpentine spring 16 can also twist torsionally, to accommodate tilting in other directions. In the Figures, but not necessarily all examples, the serpentine spring is an approximately-planar zig-zag pattern, which can be fabricated using vapour deposition techniques.

FIGS. 2 and 3 show that the distal end (lateral beam 105) of an electromagnetic microactuator 10, in its undeflected state, may have a z-axis height similar to its maximum x-axis span from the terminals 22A, 22B, corresponding to an angle of around e.g. 45 degrees±30 degrees above the plane of the substrate. If the electromagnetic microactuators 10 are too vertical or not vertical enough, the deflection for a given actuation energy may be small.

FIG. 2 shows the field generator 30 below the substrate 20, directing a magnetic field in an upwards direction approximately perpendicular to the plane 21 of the substrate 20, as shown in FIG. 1. This enables the electromagnetic microactuator 10 to curl (deflect) in the x-z plane, about the y-axis. Although the field generator 30 could be located elsewhere, the illustrated position does not increase the overall footprint of the apparatus 1, making the apparatus 1 easier to integrate with existing circuit boards. A further advantage is that the electromagnetic microactuators 10 receives the same magnetic field strength despite being at different locations. The field generator 30 may be supported on the second side of a two-sided substrate 20, or may be supported by a separate structure.

The stressed lateral beam 105 may tend to curl the loop into a sphere unless the lateral beam 105 is sufficiently stiff against deflection in the y-z plane about the x-axis. The cross-section of the illustrated lateral beam 105 has an x-axis width greater than its z-axis height, such as a rectangular cross-section. This makes the lateral beam 105 weak against bending in the unintended y-z plane. Therefore, the lateral beam 105 may comprise a twisted portion 106 along its span, to increase stiffness of the lateral beam 105 against deflection in the unintended y-z plane without increasing material mass.

Another method of preventing the loop from curling into a sphere without adding too much material mass, is to vary the z-axis thickness of at least one layer of the beam. The variable-thickness layer may be corrugated to form a ribbed or waffled shape, for example. FIG. 4B shows a cross-section of a beam of the electromagnetic microactuator 10, revealing a plurality of ribs 111 at its underside, through the lowest layer 11. In other examples, the ribs 111 could be in another layer. The ribs 111 extend substantially in the y-axis, to reduce y-z bending. The ribs 111 may be present in the lateral beam 105, extending in substantially the same y-axis direction as the lateral beam 105. Optionally, the y-axis ribs 111 may also be present in the lengthwise beams 102A, 102B, extending in the y-axis direction non-parallel to the direction of the lengthwise beams 102A, 102B. If the variable-thickness layer is waffled, cross-ribs (not shown) may extend substantially in the x-axis, interconnecting the ribs 111.

The ribs 111 and the twisted portion 106 help to ensure that the beams 102A, 102B, 105 bend in the direction of a cylinder, instead of a sphere.

Figure 4B:
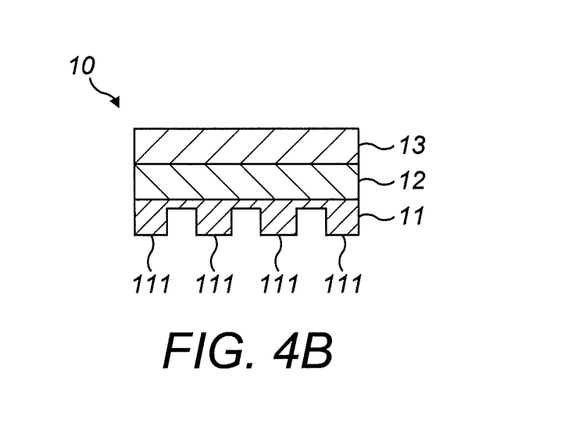
Figure 5:
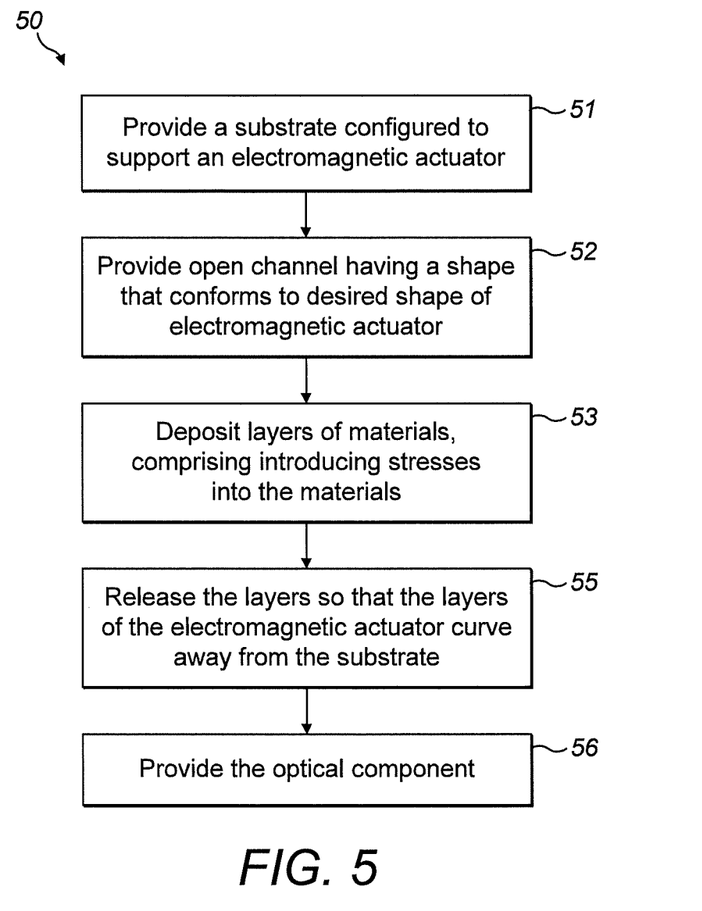
FIG. 5 illustrates an example method of manufacturing an apparatus.

FIG. 3 also shows a corrugated channel 24 on or in the substrate 20, which is left behind after fabrication of the electromagnetic microactuator 10 according to the example method 50 of FIG. 5. The channel 24 has substantially the same loop shape as the electromagnetic microactuator 10, and has a cross-sectional shape that substantially conforms to a cross-sectional shape of the electromagnetic microactuator 10 as shown in FIG. 4B. Layers of the electromagnetic microactuator 10 are initially deposited within the channel 24, using the technique described later in relation to FIG. 5. A corrugated surface of the channel 24 forms the ribs 111. Residual stress is then introduced, to curl the electromagnetic microactuator 10 out of the channel 24 as shown in FIG. 3.

The floor of the channel 24 may comprise the corrugated surface, comprising rib-forming peaks 26A and troughs to form ribs 111, and/or cross-rib forming peaks 26B and troughs to form cross-ribs.

Figure 4A:
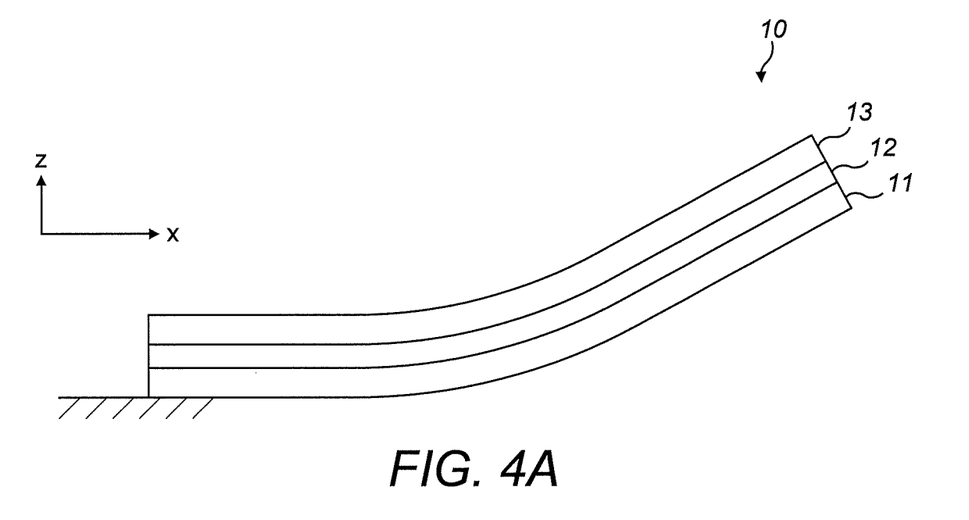
FIGS. 4A, 4B illustrate layers of an example electromagnetic microactuator, and a cross-section.

FIG. 4A shows an example three-layer beam. The beam may be a lengthwise beam 102A, 102B.

Examples of materials for the layers 11, 12, 13 are provided below. For example, the first layer 11 may comprise a Silicon-based material such as PolySilicon. PolySilicon has excellent mechanical properties for MEMS applications. The second layer 12 may comprise Chromium. The purpose of the Chromium is to act as an adhesion layer between the lower layer 11 and the upper layer 13. The Chromium layer 12 may only be a few atomic layers thick. The upper layer 13 is an electrically conductive material such as Gold, which alloys with the Chromium and is not added until after the residual stresses have been introduced.

It would be appreciated that PolySilicon can be substituted for equivalents. Further, Chromium can be substituted for equivalent adhesion elements such as Titanium or Platinum. Further, Gold can be substituted for equivalent electrically conductive materials such as Aluminium, Copper or Silver.

It would also be appreciated that the number of layers may differ at different positions around the electromagnetic microactuator 10. For example, the first and second layers 11, 12 may be present at regions of the electromagnetic microactuator 10 that need to be curved upwardly, but absent at other regions.

It would be appreciated that the electromagnetic microactuator 10 does not necessarily need to have three layers. For example, a bi-layer arrangement or more than three layers may be provided. In the above example, the Chromium intermediate layer 12 is useful for binding the Gold to the Polysilicon-based layers. However, if Gold is substituted with another electrically conductive material (e.g. Aluminium) that can bond directly to the Polysilicon-based layers, then a bi-layer may be used.

Figure 6:
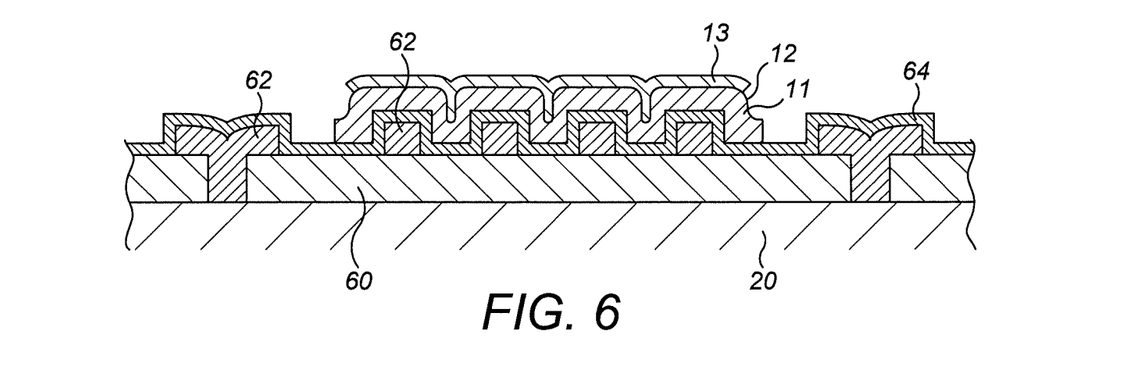
FIG. 6 illustrates an example cross-section of an apparatus during fabrication.
Figure 7A:
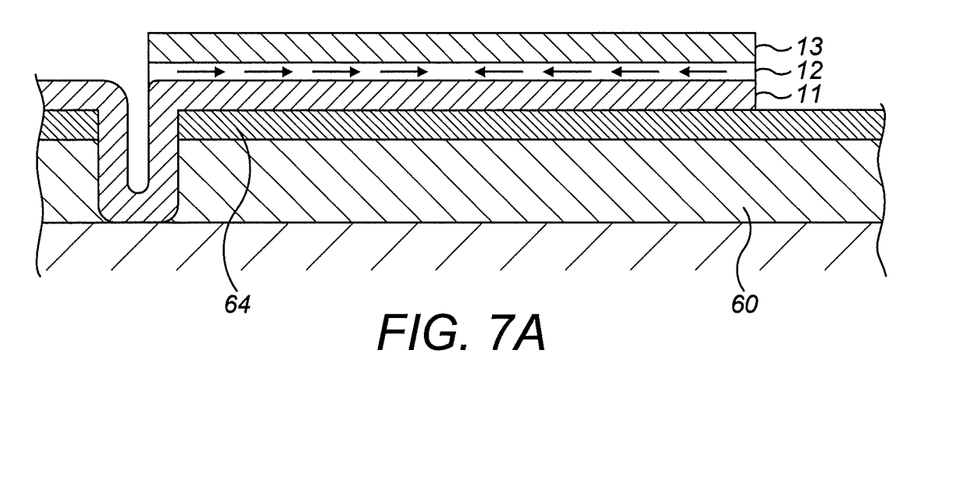
FIGS. 7A, 7B illustrate example cross-sections of an apparatus during and after fabrication.
Figure 7B:
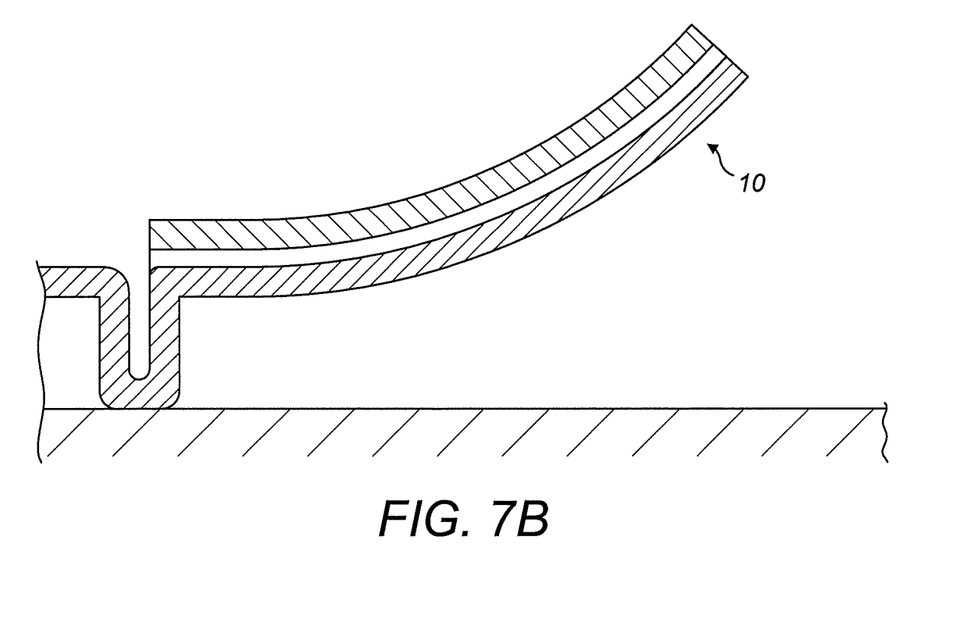

FIG. 5 is an example of a method 50, illustrating in more detail an efficient glue-free manufacturing process with minimal etching. In FIG. 5, but not necessarily all examples, the electromagnetic microactuator 10, and optionally the optical component 14, are manufactured using chemical and physical vapour-deposition techniques. FIGS. 6 and 7A, 7B show cross-sectional views of the apparatus 10 during and after a MEMSCAP PolyMUMPS™ fabrication process that incorporates the operations of FIG. 5.

At block 51, the method 50 comprises providing the substrate 20. In an example implementation, the substrate 20 is provided into a deposition chamber of a vapour-deposition device. The substrate 20 may be Silicon-based, or any other suitable substrate 20 that can withstand the temperatures expected during fabrication.

At blocks 52 to 55, the method 50 comprises providing the electromagnetic microactuator 10, for example by vapour deposition.

Block 52 comprises providing the channel 24 on or in the substrate 20. In an example implementation, the channel 24 is provided on the substrate 20 by deposition. The channel 24 may comprise Polysilicon, deposited by chemical vapour deposition. The deposition may be patterned, to create rib-forming peaks 26A, 26B and troughs.

FIG. 6 is a cross-section through the apparatus during fabrication, showing an example of the channel. A first etchable layer 60 such as an oxide layer ('Oxide 1') is deposited on the substrate. Then, a pair of substantially parallel grooves are etched into the Oxide 1 layer 60. The grooves follow a loop-shaped path. Then, a first Polysilicon layer 62 ('Poly1') is deposited. The Poly1 62 is deposited into the grooves and extends above the tops of the grooves, to create rail-like channel walls. The grooves function as anchors to keep the Poly1 (62) in place.

The same Poly1 (62) may also be deposited in a pattern within the channel 24, to create the rib-forming peaks 26A, 26B and troughs.

The resulting channel topography functions as a mould within which the layers of the electromagnetic microactuator 10 can be deposited, in the required shape.

The same deposition step 52 can be used to create a substrate layer of the optical component 14.

As shown in FIG. 6, a second etchable layer 64 such as an oxide layer ('Oxide 2') may be uniformly deposited on top of the channel topography. The layers 11, 12, 13 of the electromagnetic microactuator 10 can then be deposited onto the Oxide 2 layer 64. The Oxide 2 (64) can later be etched away to free the electromagnetic microactuator 10 from the channel 24.

Block 53 comprises depositing the layers 11, 12, 13 of materials in the channel 24, comprising introducing stresses into the layers. If the first, lowest layer 11 comprises Polysilicon ('Poly2'), chemical vapour deposition may be used. In FIG. 6, the Poly2 (11) is deposited onto the rib-forming peaks and troughs within the channel, to create a ribbed surface.

If the second layer 12 comprises Chromium, the Chromium may be deposited by thermal evaporation using a physical vapour deposition process. Introducing the stress may comprise depositing the second layer 12 with tensile stress. In other examples, a layer may be deposited with compressive stress, and/or a stress gradient may be introduced into a single layer. The stress can be adjusted by, for example, controlling pressure in the deposition chamber and/or thermal treatment (annealing) before release.

In some examples, the third layer 13 is deposited in the same step as the deposition of the second layer 12. The second layer 12 binds the third layer 13 to the first layer 11.

In some examples, the third layer 13 is a Gold layer. Poly2 and Gold are low-stress materials, compared with Chromium. As a result, a stress gradient is provided between the layers.

The same deposition step 53 can be used to create the resilient member 16, and even a second substrate layer of the optical component 14, for added stiffness. For example, the Poly2 (11) may be used. PolySilicon is semiconductive which is substantially electrically insulating compared to the Gold. This is useful for preventing a short circuit path via the resilient member 16 and the optical component 14.

Block 55 comprises releasing the layers 11, 12, 13. In an example, releasing the layers comprises etching away one or both of the etchable layers Oxide 1 (60) and Oxide 2 (64).

The residual stress then relaxes by bending the layers upwards away from the plane 21 of the substrate 20, lifting the optical component 14 as shown in FIG. 7B.

At block 56, fabrication of the optical component 14 may be completed. For example, a reflective material may be added to the earlier-described substrate of the optical component 14. This could be performed before or after release.

The illustration of a particular order to the blocks of FIG. 5 does not necessarily imply that there is a required or preferred order for the blocks and the order and arrangement of the block may be varied. Furthermore, it may be possible for some steps to be omitted.

In an experiment, the apparatus 1 as shown in FIGS. 2 and 3 was made using the method 50 of FIG. 5. The apparatus 1 was able to tilt the optical component 14 by 18 degrees with a drive voltage of just five volts, by actuating only one loop 10. Low voltages are especially useful for portable applications. The entire substrate 20 was only 2.5 mm×2.5 mm. The loop 10 had a span of approximately 1 mm, and supported an optical component 14 of radius 250 micrometers, at a height of around 250 micrometers above the substrate. The MEMSCAP PolyMUMPS™ foundry service was used to fabricate the chip. The field generator 30 was a 6000 Gauss Neodymium axially-magnetised circular permanent magnet, suitable for being miniaturized while still generating a powerful magnetic field. The thickness of the magnet in the experiment was only 1.5 mm.

An example of an application that benefits from the fast microactuator response times of the apparatus is optical coherence tomography. Optical coherence tomography is an imaging technique that uses low-coherence light to capture micrometre-resolution images (2D or 3D) from within optical scattering samples such as biological tissue. Optical coherence tomography can be used for medical imaging and nondestructive testing. Optical coherence tomography generally uses low-coherence interferometry, and usually the light is in the near-infrared spectrum.

Optical coherence tomography systems may be used for non-invasive health monitoring. Optical coherence tomography systems generally scan a laser at discrete points in a shaped (e.g. rectangular) array on the skin surface that is being scanned. A depth scan is performed at each array point by sweeping the wavelength. The scanned volume could be up to ten millimetres cubed or more, depending on factors such as required resolution and scanning speed. Backscattered light is detected during each array point scan and provides structural and/or chemical composition information. It is desirable to perform this scan quickly, so that information is acquired as rapidly as possible, which aids in the usefulness and applicability of the approach. A related factor is that if a scan takes too long, a patient may move, and the scan is no longer accurate. Some fast MEMS-based techniques require high electrical voltage to maintain high scan rates. High required voltages is impeding the development of portable optical coherence tomography systems with handheld scanners. Some MEMS-based techniques are too slow when using lower electrical voltages. Aspects of the present apparatus 1 advantageously enables a scanning technique that is fast and requires low electrical voltage, to facilitate the development of portable (or nonportable) optical coherence tomography systems. The apparatus 1 could even be made wearable.

Figure 8:
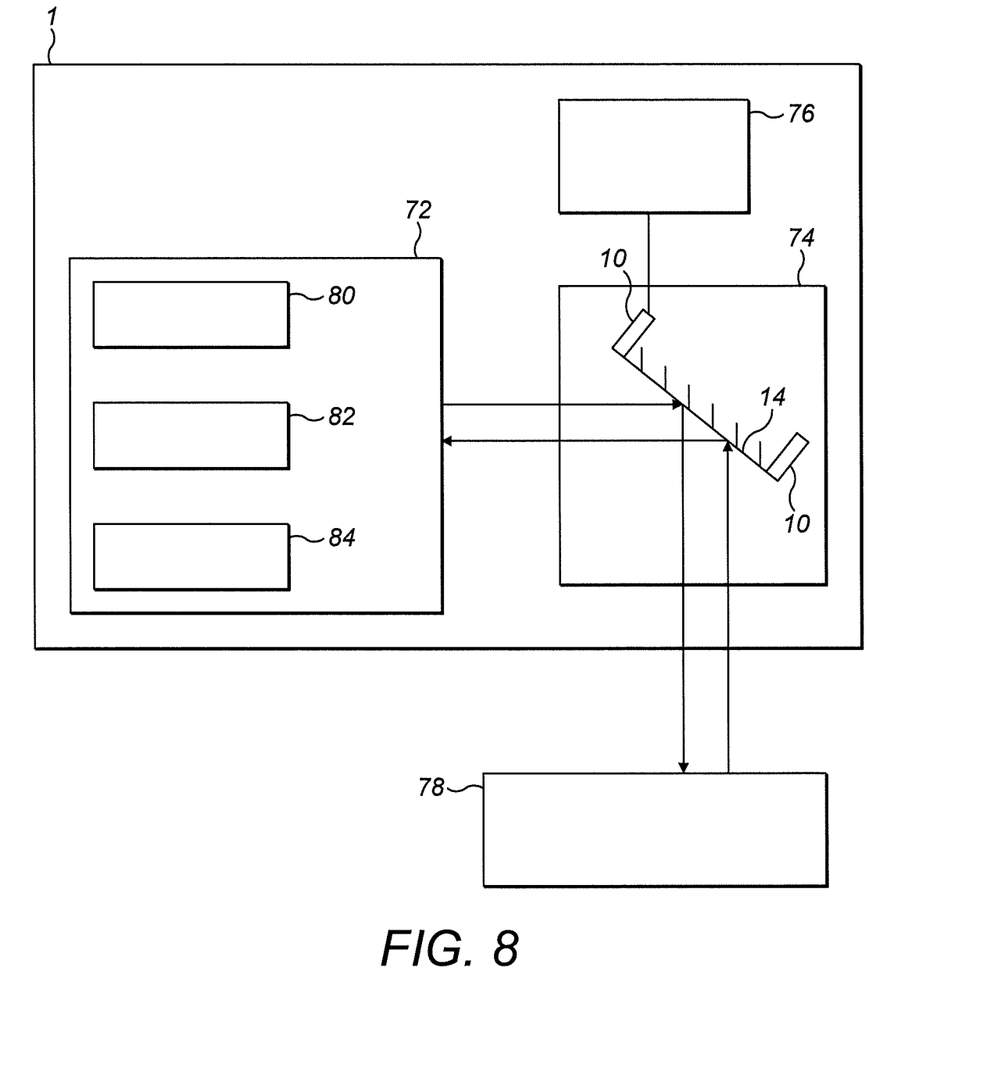
FIG. 8 illustrates an example of an optical coherence tomography system.

Therefore, FIG. 8 illustrates an example of the apparatus 1, wherein the apparatus 1 comprises an optical coherence tomography system 72 and an optical arrangement 74 comprising the optical component 14. In some, but not necessarily all examples, the apparatus 1 may also comprise a controller 76 or a communication interface for communicating with a remote controller.

The optical coherence tomography system 72 comprises means for providing a beam of light to a sample 78 and means for receiving reflected light back from the sample 78. The optical coherence tomography system 72 may also comprise means for combining the reflected light with reference light to enable the interference between the reflected light and the reference light to be analysed. For example, the optical coherence tomography system 72 may comprise an interferometer 80 and any other suitable means. The optical coherence tomography system 72 may comprise other elements that may enable light to be provided to a sample 78 and reflected light to be analysed to obtain an optical coherence tomography image. In some examples the integrated optoelectronic circuit may comprise one or more light sources 84 and one or more detectors 82. The light source 84 may comprise a coherent light source such as a laser or any other suitable light source. The detector 82 may comprise one or more diodes such as a photodiode. The electrical output of the detector 82 comprises information about the light reflected from the sample 78. This can be processed to generate a three dimensional image of the sample 78. The controller 76 may comprise: at least one processor; and at least one memory including computer program code, the at least one memory and the computer program code configured to, with the at least one processor, cause the controller 76 at least to control the one or more microactuators 10.

The optical component 14 may be a mirror. The optical component 14 is positioned so that light from the light source 84 of the optical coherence tomography system 72 is incident on the optical component 14. The one or more microactuators 10 may be configured to move (e.g. rotate) the optical component 14 in at least one direction relative to the optical coherence tomography system 72. The microactuators 10 may be operably coupled to the controller 76. The microactuators 10 and the optical component 14 are configured to enable the light to be scanned in at least one direction to enable a multi-dimensional optical coherence tomography image to be obtained. The optical component 14 may be deflected to enable scanning of different array points.

The optical arrangement 74 and/or the optical coherence tomography system 72 may also comprise conventional optical elements (not shown) such as lenses or beam splitters/combiners to shape and focus light, and direct light between the functional components of the apparatus 1.

The apparatus is not necessarily restricted to optical coherence tomography. Other use cases include, for example, other miniaturized scanning devices such as head-up displays, microprojectors, etc. The apparatus can be readily integrated with existing circuit boards/housings, by packaging the mirror above the substrate chip and the magnet below the chip.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. In some examples, the mirror could be located to the side rather than behind. In some examples, the magnetic field may be varied in addition to or instead of varying the electrical current, by using an appropriate variable field generator. Multiple field generators may be used. In some examples, to enable tilt in one axis, pairs of microactuators may be replaced with a single microactuator. In some examples, the microactuator may not be continuously curved in the x-z plane, and may comprise curved and non-curved regions. In some examples, part of the microactuator may be curved downwards, for example to create an s-shape.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
   an optical component;
   at least one electromagnetic microactuator configured to deflect the optical component; and
   a substrate configured to support the electromagnetic microactuator,
   wherein in an undeflected state the electromagnetic microactuator is configured to support the optical component above a plane of the substrate, and
   wherein the electromagnetic microactuator is configured to deflect from the undeflected state, to deflect at least a portion of the optical component towards the plane of the substrate without the portion of the optical component intersecting the plane of the substrate;
   wherein the electromagnetic microactuator comprises one or more lengthwise beams extending from the substrate and configured to deflect in a first plane to deflect the portion of the optical component, wherein the electromagnetic microactuator comprises a lateral beam supported by the one or more lengthwise beams, and wherein the lateral beam comprises a twisted portion that stiffens the lateral beam against deflection in a second plane orthogonal to the first plane.

2. The apparatus of claim 1, wherein the electromagnetic microactuator comprises layers of materials having different stresses that curve the electromagnetic microactuator away from the plane of the substrate.

3. The apparatus of claim 1, comprising a channel having a cross-sectional shape that substantially conforms to a cross-sectional shape of the electromagnetic microactuator, wherein the channel is substantially parallel to the plane of the substrate, and wherein the electromagnetic microactuator curves away from the channel upon application of an electrical current.

4. The apparatus of claim 3, wherein the channel comprises a corrugated surface.

5. The apparatus of claim 1, wherein the electromagnetic microactuator supports the optical component via a resilient member, and wherein the resilient member is configured to resiliently linearly deflect as the electromagnetic microactuator deflects the portion of the optical component towards the plane of the substrate.

6. The apparatus of claim 1, wherein the electromagnetic microactuator is configured to deflect in a first plane to deflect the portion of the optical component, and wherein the electromagnetic microactuator comprises a variable-thickness layer having a first stiffness against deflection in the first plane, and a second, greater stiffness against deflection in a second plane orthogonal to the first plane.

7. The apparatus of claim 1, wherein the electromagnetic microactuator comprises a first lengthwise beam extending from the substrate and a second lengthwise beam extending from the substrate, wherein the first lengthwise beam and the second lengthwise beam diverge from each other at a proximal region, proximal to the substrate.

8. The apparatus of claim 1, wherein the electromagnetic microactuator comprises a first lengthwise beam and a second lengthwise beam, wherein at least one of the first lengthwise beam or the second lengthwise beam comprises a transitional direction change at a distal corner region of at least one of the first lengthwise beam or the second lengthwise beam, and wherein the transitional direction change is in a direction that converges the first lengthwise beam and the second lengthwise beam towards each other.

9. The apparatus of claim 1, wherein a surface of the substrate extends below the optical component.

10. The apparatus of claim 1, wherein the at least one electromagnetic microactuator comprises a plurality of electromagnetic microactuators, collectively configured to deflect the optical component about at least two axes.

11. The apparatus of claim 10, wherein the plurality of electromagnetic microactuators comprises four electromagnetic microactuators in a quadrantic arrangement.

12. The apparatus of claim 1, wherein the electromagnetic microactuator is further configured to deflect from the undeflected state to deflect the portion of the optical component away from the plane of the substrate.

13. The apparatus of claim 12, wherein the apparatus comprises a first electrical terminal and a second electrical terminal on the substrate, wherein the electromagnetic microactuator comprises electrically conductive material electrically interconnecting the first electrical terminal and the second electrical terminal, wherein the electrically conductive material is configured to extend in a path occupying a plane that is not wholly perpendicular to an applied magnetic field, and wherein the first electrical terminal, the second electrical terminal, and the electrically conductive material are configured for bi-directional electrical current flow to enable bi-directional deflection of the electromagnetic microactuator.

14. The apparatus of claim 1, comprising a field generator configured to generate a magnetic field.

15. The apparatus of claim 14, wherein the electromagnetic microactuator is supported to a first side of the substrate, and wherein the field generator is supported to a second side of the substrate.

16. The apparatus of claim 1, wherein the optical component is a reflector.

17. The apparatus of claim 16, comprising an optical coherence tomography system, wherein the reflector is positioned so that light from a light source of the optical coherence tomography system is incident on the reflector, and wherein the electromagnetic microactuator is configured to move the reflector in at least one direction relative to the optical coherence tomography system.

18. An apparatus, comprising:
an optical component;
at least one electromagnetic microactuator configured to deflect the optical component; and
a substrate configured to support the electromagnetic microactuator;
wherein in an undeflected state the electromagnetic microactuator is configured to support the optical component above a plane of the substrate;
wherein the electromagnetic microactuator is configured to deflect from the undeflected state, to deflect at least a portion of the optical component towards the plane of the substrate without the portion of the optical component intersecting the plane of the substrate; and
wherein the electromagnetic microactuator comprises a first lengthwise beam extending from the substrate and a second lengthwise beam extending from the substrate, wherein the first lengthwise beam and the second lengthwise beam diverge from each other at a proximal region, proximal to the substrate.

19. An apparatus, comprising:
an optical component;
at least one electromagnetic microactuator configured to deflect the optical component; and
a substrate configured to support the electromagnetic microactuator;
wherein in an undeflected state the electromagnetic microactuator is configured to support the optical component above a plane of the substrate;
wherein the electromagnetic microactuator is configured to deflect from the undeflected state, to deflect at least a portion of the optical component towards the plane of the substrate without the portion of the optical component intersecting the plane of the substrate; and
wherein the electromagnetic microactuator comprises a first lengthwise beam and a second lengthwise beam, wherein at least one of the first lengthwise beam or the second lengthwise beam comprises a transitional direction change at a distal corner region of at least one of the first lengthwise beam or the second lengthwise beam, and wherein the transitional direction change is in a direction that converges the first lengthwise beam and the second lengthwise beam towards each other.

* * * * *